(12) United States Patent
Galvez-Ramos (10) Patent No.: US 8,074,303 B2
(45) Date of Patent: Dec. 13, 2011

(54) NOISE REDUCING VALVE FOR TOILET SYSTEMS

(75) Inventor: Antonio Martin Galvez-Ramos, Wellington, FL (US)

(73) Assignee: Antonio M. Galvez-Ramos, Wellington, FL (US)

( * ) Notice: Subject to any disclaimer, the term of this patent is extended or adjusted under 35 U.S.C. 154(b) by 1196 days.

(21) Appl. No.: 11/803,789

(22) Filed: Jul. 3, 2007

(65) Prior Publication Data

US 2009/0008585 A1    Jan. 8, 2009

(51) Int. Cl.
*E03D 1/34*    (2006.01)

(52) U.S. Cl. ................................. 4/378; 4/387

(58) Field of Classification Search ............... 4/387, 378
See application file for complete search history.

(56) References Cited

U.S. PATENT DOCUMENTS

| 758,012 | A | * | 4/1904 | Marsh | 4/387 |
| 1,404,594 | A | * | 1/1922 | Gable | 4/387 |

* cited by examiner

*Primary Examiner* — Dinh Nguyen
*Assistant Examiner* — Viet Le (57) ABSTRACT

The components used in this invention has never been utilized in this special type of arrangement ever before. This new "Noise Reducing Valve for Toilet Systems" does not exist and cannot be found anywhere.

Once available to the public it will be very useful and will help many light sleeper to have a better change of getting a good sleep at night, as they will not have to listen to loud toilet noises at night, on whenever they take a sleep.

3 Claims, 9 Drawing Sheets

NOISE REDUCING VALVE FOR TOILET SYSTEMS

BACKGROUND OF THE INVENTION

A common problem when using a toilet is the loud noise level that comes from the unit after the flushing. This noise is so loud and even embarrassing, that during late hours of the night when people are enjoying their sleep time, it will awake many light sleepers and specially babies.

Once a person awakes at night it will take them some time to go back to deep sleep or in some cases this will not even be possible as some people have difficulties falling sleep again.

I personally have experienced the need to use my toilet more than once at night, and after flushing it, my wife had awaken and later was difficult for her to go back to deep sleep. To make matters worse the next morning she was tired and sleepy, but still needed to go to work.

I believe this noise problem can be fixed, so people can rest better without having to be awakened by noisy toilets.

All the above motivated me to find a solution and to help others with this common problem that we all suffer.

BRIEF SUMMARY OF THE INVENTION

After giving it much thought and inspecting several brands of Toilet-Tank systems, I was able to identify where the noise was coming during the flushing.

The problem came when the water in the tank reservoir went through the inner pipe that connects the Tank to the Toilet Bowl. Here the water had to do a sudden and rapid 90 degrees (approx) change of direction after colliding with the top backside of the toilet bowl, on his way down to the bowl and to the drain.

I realized that by changing the direction of the water in a more gradual way, it would reduce most of the noise created at this point. What I needed was a new valve that would reduce the noise level by changing the direction of the water gradually instead of suddenly, and after making several prototypes, I was able to come up with the "Silencer Valve", which I have successfully designed, installed and tried in my toilet.

DESCRIPTION OF THE DRAWINGS

A better understanding of the Silencer Valve will be had by reference to the drawings wherein.

DETAILED DESCRIPTION OF THE INVENTION

The most common system found in the bathroom of a house is the two-piece tank toilet system, where the tank is situated above the toilet.

There are many different brands, models and variations of tank and toilet systems, but most of them are very much alike with slight differences. For this particular case, I am using an American Standard, Plebe model.

The tank is the place where the flushing water is stored, and here is where we find two very common valves:
The Fill Valve, and the
Flush Valve After pushing down the Flush handle (2), the Flapper (4) of the Flush Valve, opens and lets the water rush down the bottom tube of this valve into the Toilet Inlet (13), and here is where a lot of noise is produced.

After the water from the tank (1) gets inside the Toilet Inlet (13) it starts to whirls around the bowl and finally exits through the Toilet drain (11).

The idea behind this invention is to reduce the noise produced by this flushing action, and because most of the noise is made when the water is traveling from the tank (1) to the drain (11), here is where something needed to be interfaced, in order to reduce the noise.

I devised a way to minimize the sound made by the water, and it is basically to change the angle and speed in which the water travels from the tank to the toilet, by using a Silencer Valve (8) located at the bottom of the Flush Valve pipe (12) and the Toilet Inlet (13).

This Silencer Valve has to be easy to install and remove so any person could install it with easiness and quickness, in their existing Toilet-Tank systems.

Figure 1:
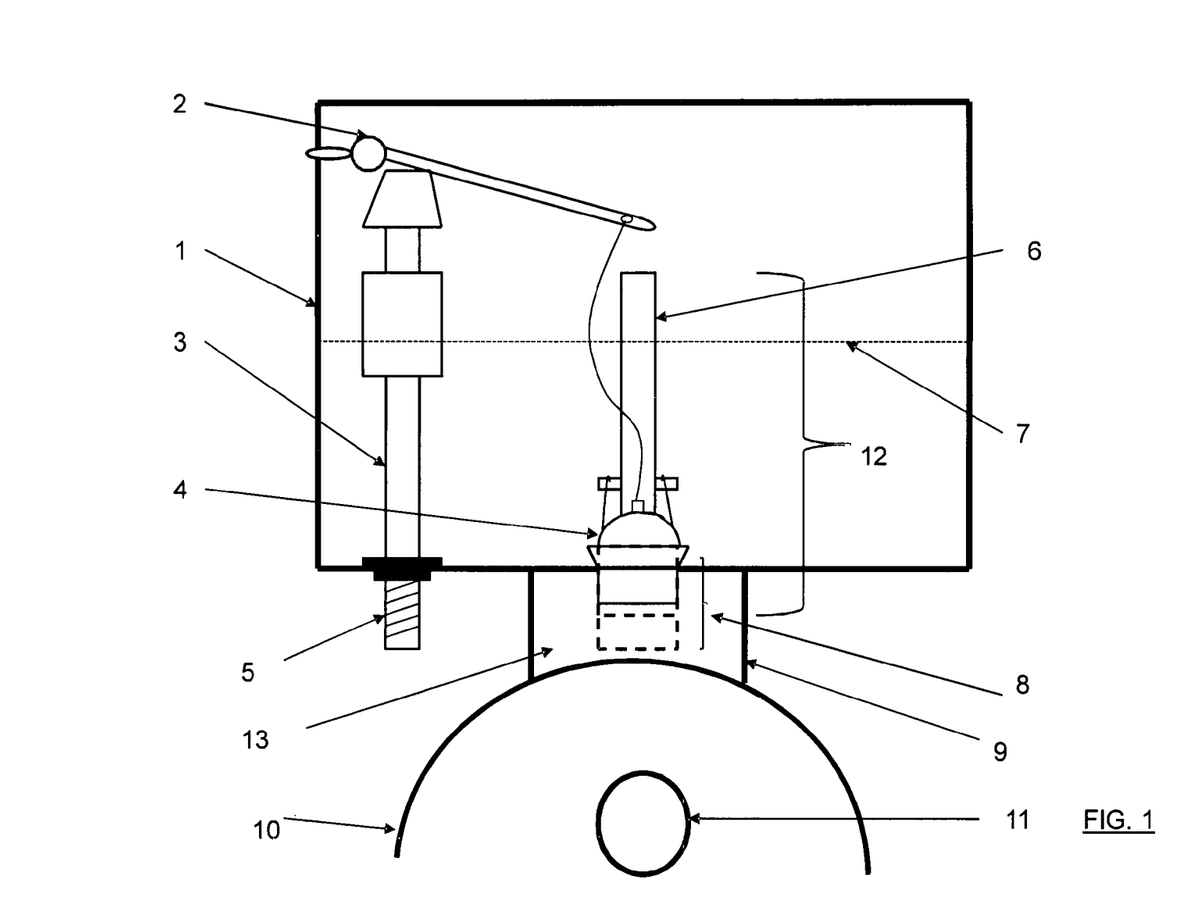
FIG. 1 Is a view of a Toilet-Tank System, where the following components:
1—Tank reservoir where the water is stored
2—Flush handle, used to empty the Tank
3—Fill Valve. Used to fill the tank with water
4—Flapper, part of the Flush Valve
5—Water Inlet,
6—Overflow Pipe
7—Water line level
8—Silencer Valve already installed inside the Flush Valve, with the flat angle piece "Slider" sticking out into the Toilet Inlet.
9—Toilet, the other component of the Tank-Toilet system
10—Toilet Bowl
11—Toilet Drain, where the water finally exits
12—Flush Valve
13—Toilet Inlet, the chamber where the water from the tank enters the toilet FIG. 2 Is a Side view of the Silencer Valve. It shows the following components:
14—The Cylindrical body
15—The flat Angle piece, also called the "Slider".
Figure 2:
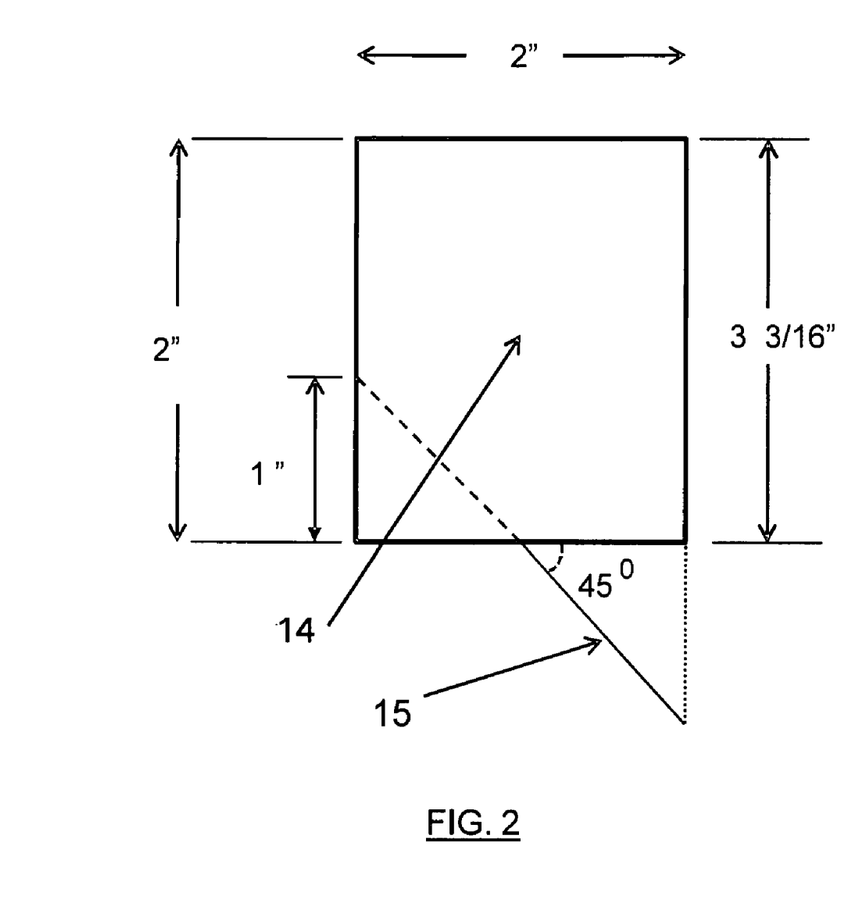

In the FIG. 2 where the Silencer is Shown, we can see that this unit has two main components. The Cylindrical body (14) and a Flat Angle piece (Flat Slider) (15).

The Cylindrical body has the purpose This Silencer Valve has to be easy to install and remove so any person could install it with easiness and quickness, in their existing Toilet-Tank systems.

In FIG. 2 where the Silencer Valve is shown, we can see that this unit has two main components. The cylindrical body to hold the Flat Angle piece in place and at the right position. It also makes the installation of this valve very fast and easy. In the present example, the inner diameter of the bottom pipe of the Flush Valve is 2 inches (this is the most common size for this valves), so in order to have a good fit; the outside diameter of the Silencer Valve is about 15/16 inches.

Figure 3:
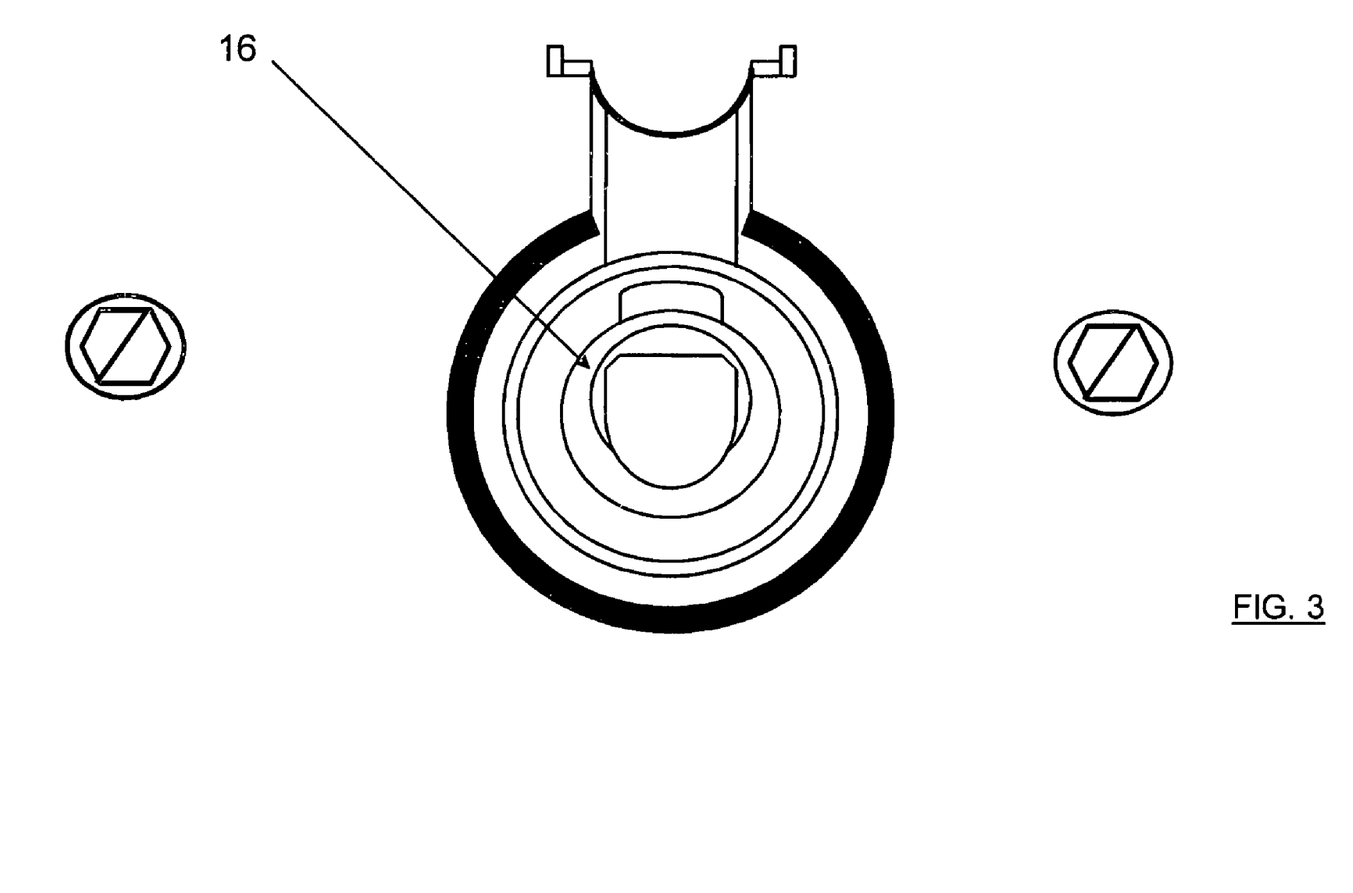
FIG. 3 Is a Top cut view of the Flush Valve, where we can see:
16—The Silencer Valve already installed, just below the Flush Valve water outlet, so it does not block it.
Figure 4:
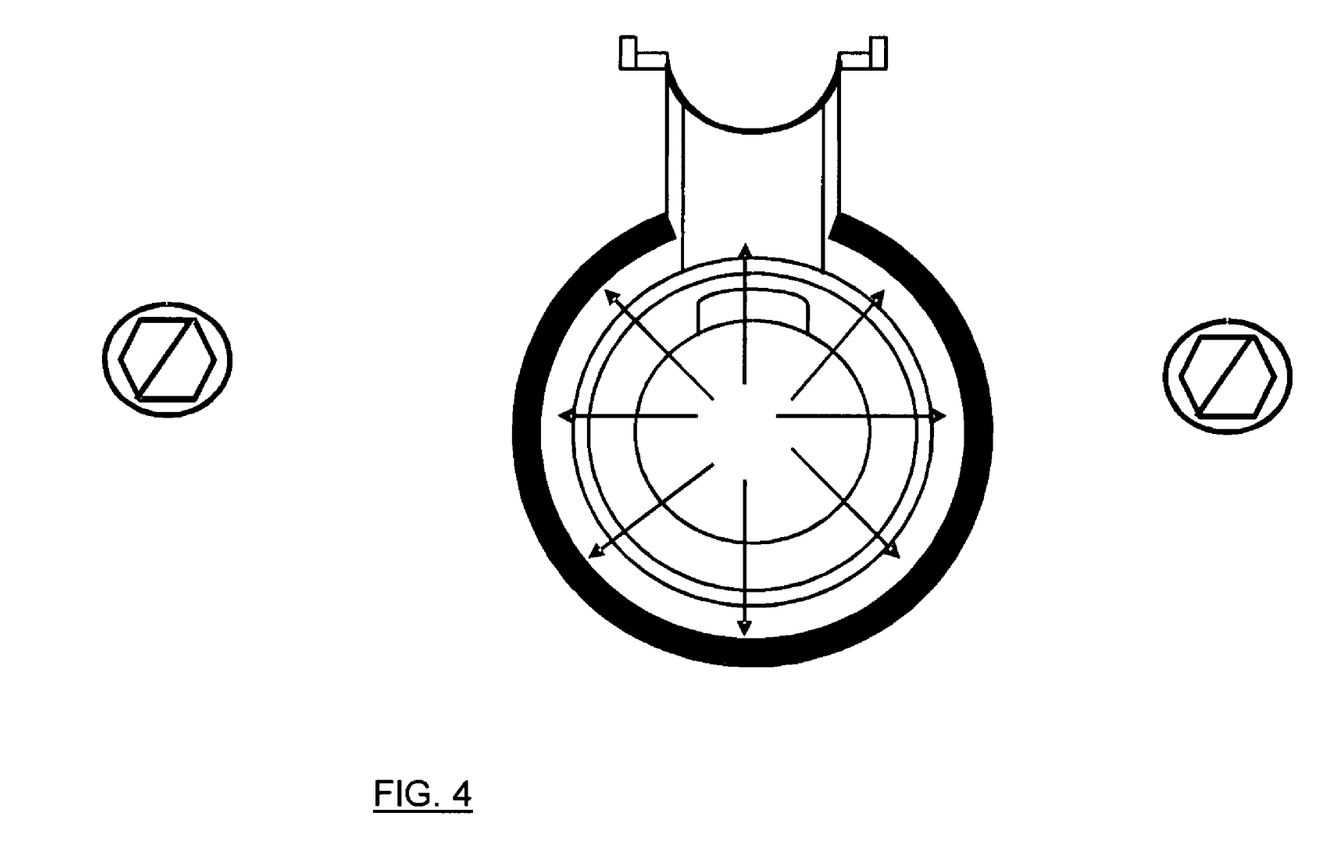
FIG. 4 Is Top cut view of the Flush Valve during flushing. Here the arrows indicate the different directions that the water takes when entering the Toilet Inlet during the flushing.
Figure 5:
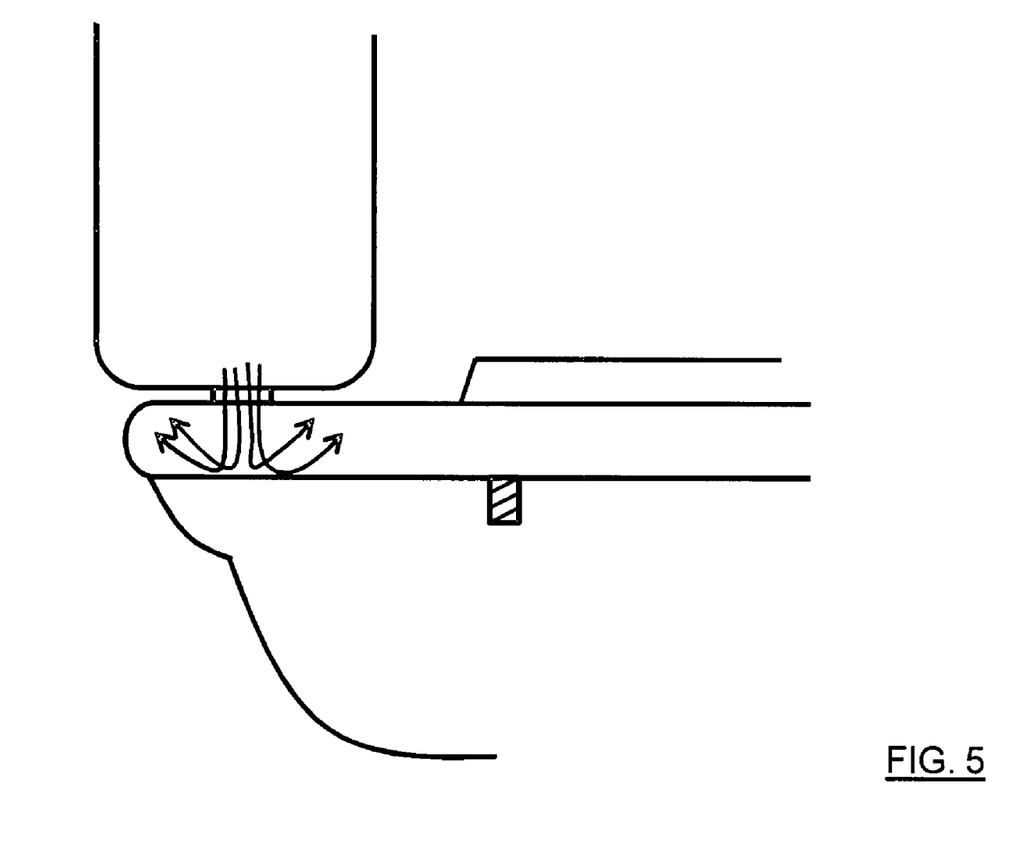
FIG. 5 Is a cut side view of the Toilet-Tank system during the flushing, without the Silencer Valve. The arrows indicate the chaotic direction of the water.
Figure 6:
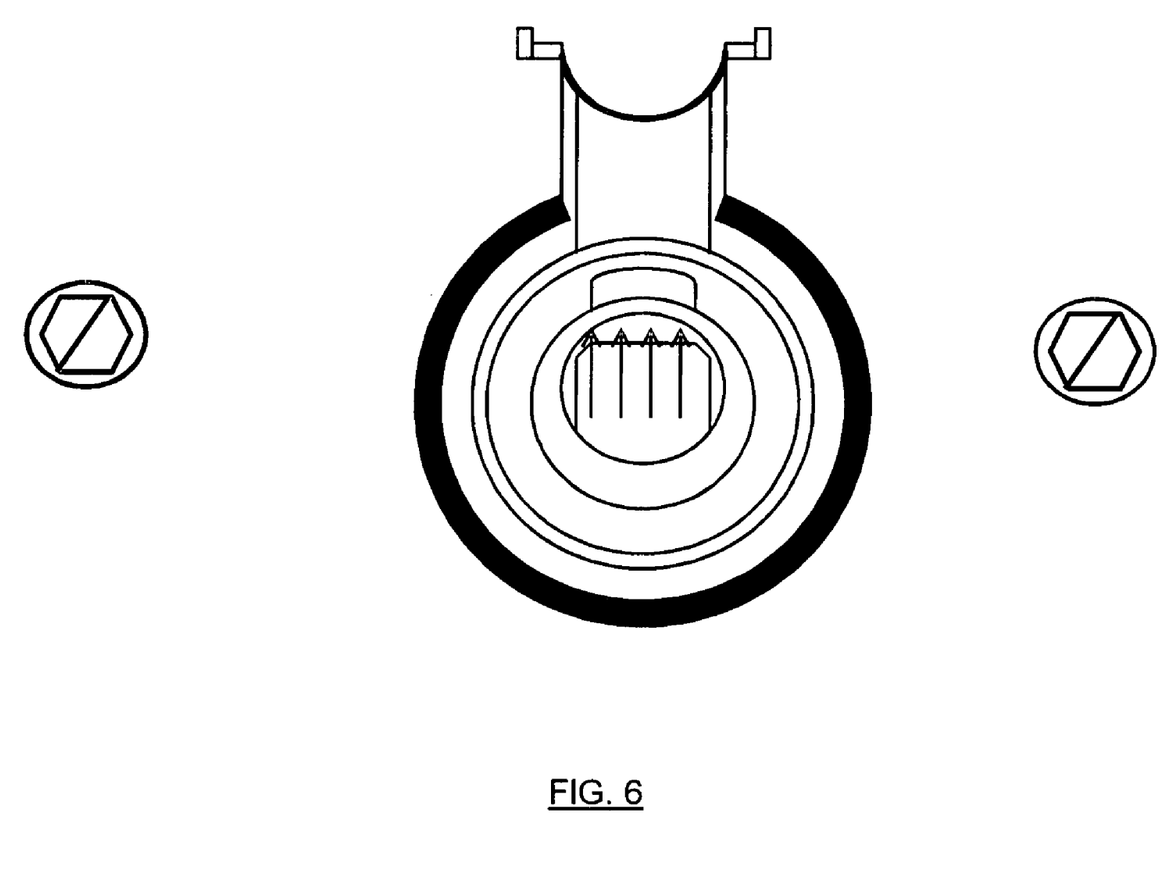
FIG. 6 Similar as FIG. 4, but with the Silencer Valve installed. The arrows represent the new direction of the water.
Figure 7:
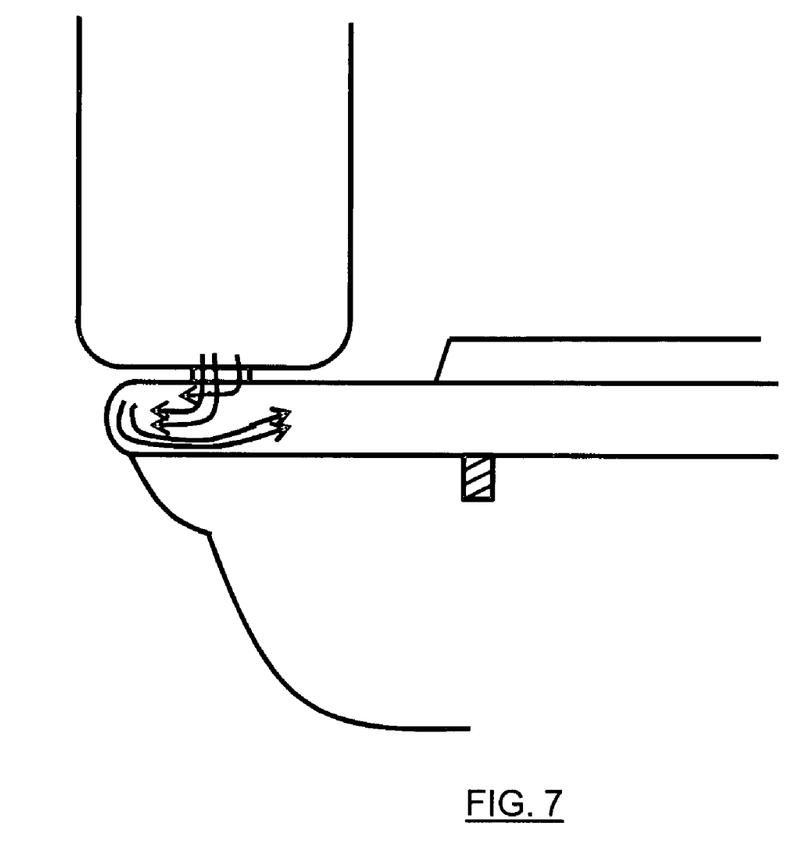
FIG. 7 Similar to FIG. 5, but now with the Silencer Valve installed. The arrows represent the new direction of the water.
Figure 8:
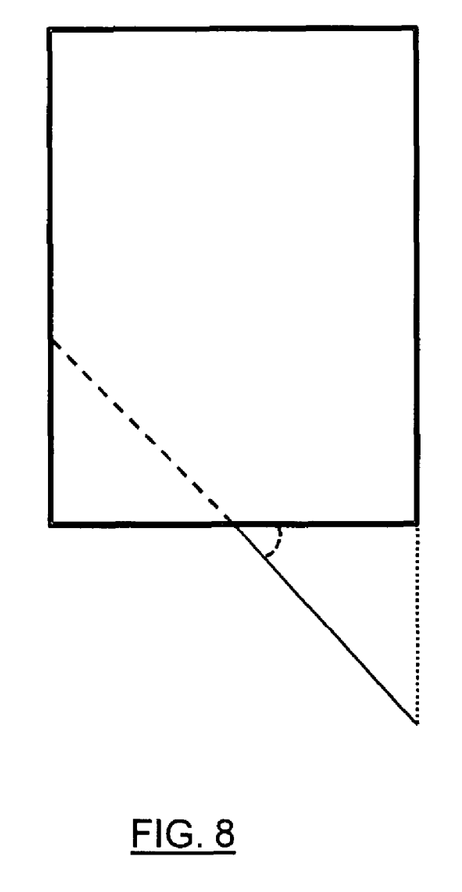
FIG. 8 Is a side view of the Silencer Valve
Figure 9:
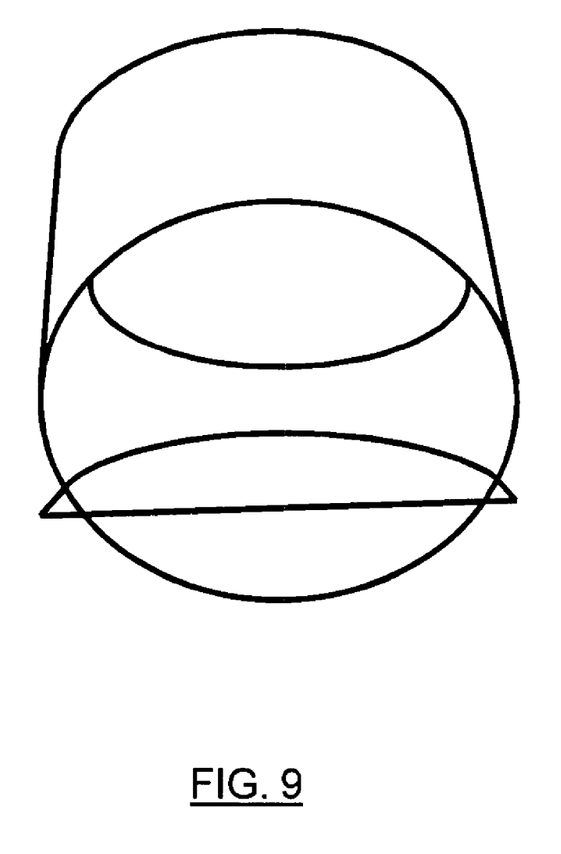
FIG. 9 Is a bottom angle view of the Silencer Valve, where we can see that the cylindrical body partially contains the flat angle piece or Slider.

It has to be located inside and under the bottom of the Flush Valve water outlet window (see FIG. 3). The direction of the Slider has to be opposite to the bowl (or towards the wall behind the tank).

The total height of this valve is 3 3/16 inches (or the distance from the lower edge of Flush Valve water window, to the bottom of the toilet inlet).

The Flat Slider (15) is solidly connected to the cylindrical body at about ½ from the bottom, and goes all the way down to the Toilet inlet (13) in an angle of about 40-50 degrees. Depending on the angle, the water is slowed more, or less, and the sound level of the water is also reduced accordingly.

For an angle of 40, it was found that the water sound level went from 74/68 dB (74 dB is the average sound level during flushing, and 68 dB is the sound level of the last 0.5 sec) to 55/68 dB (the experiment was conducted with the water inlet shut off, in order to separate the noise generated from the Filling Valve).

The measurements were taken with the toilet lids open and at a distance of 3 feet of distance from the toilet bowl.

The Tank at the time of the experiment had a capacity of 2.3 gallons of water.

For this experiment, it was used a Radio Shack Digital Sound Meter model 33-2055, with sound capture range of 50-126 dB. The experiment was successful.

This is a very simple but effective way to drastically reduce the noise level created during the flushing of a toilet. There are some side effects as a lower speed of the water during flushing, but under normal use, the toilet continues to work as usual.

The invention claimed is:

1. A toilet noise reducing valve comprising:
    a cylindrical body with an inlet, a outlet and a length in between thereof, wherein the cylindrical body has an outer diameter and an inner diameter, a flat angle piece located at the outlet of the cylindrical body,
    a cylindrical flush valve located at a bottom of a toilet tank and having an inner diameter, wherein the outer diameter of the cylindrical body is smaller than the inner diameter of the cylindrical flush valve,
    the flat angle piece is located within the inner diameter of the cylindrical body and protrudes from a bottom surface of the outlet at an angle of 40-50 degrees from an axis of the cylindrical body,
    wherein the length of the cylindrical body and a protrusion portion of the flat angle piece is at a height allowing the toilet noise reducing valve to rest at a bottom of a toilet inlet without interfering with the cylindrical flush valve's mechanism.

2. The said valve in accordance with claim 1, wherein said valve is constructed of plastic material.

3. The said valve in accordance with claim 1, wherein the valve can be installed with the flat angle piece aiming at any direction, by rotating the cylindrical body.

* * * * *